US008433967B2

United States Patent
Venkataraj

(10) Patent No.: US 8,433,967 B2
(45) Date of Patent: Apr. 30, 2013

(54) METHOD AND SYSTEM FOR DETECTING RETRANSMISSION THRESHOLD CONDITION IN SELECTIVE REPEAT ARQ COMMUNICATION SYSTEM

(75) Inventor: Naveen Kumar Venkataraj, Bangalore (IN)

(73) Assignee: Freescale Semiconductor, Inc., Austin, TX (US)

( * ) Notice: Subject to any disclaimer, the term of this patent is extended or adjusted under 35 U.S.C. 154(b) by 276 days.

(21) Appl. No.: 13/025,135

(22) Filed: Feb. 10, 2011

(65) Prior Publication Data

US 2012/0210185 A1    Aug. 16, 2012

(51) Int. Cl.
*H04L 1/18* (2006.01)

(52) U.S. Cl.
USPC .......................................... 714/748; 370/329

(58) Field of Classification Search .................. 714/748; 370/329
See application file for complete search history.

(56) References Cited

U.S. PATENT DOCUMENTS

| | | | |
|---|---|---|---|
| 6,335,933 B1 * | 1/2002 | Mallory | 370/394 |
| 6,581,176 B1 * | 6/2003 | Seo | 714/749 |
| 6,693,910 B2 | 2/2004 | Chao | |
| 6,988,236 B2 * | 1/2006 | Ptasinski et al. | 714/758 |
| 7,434,137 B2 * | 10/2008 | Itoh et al. | 714/755 |
| 7,826,871 B2 * | 11/2010 | Sudo | 455/562.1 |
| 8,205,127 B2 * | 6/2012 | Wan et al. | 714/748 |
| 2008/0209297 A1 | 8/2008 | Chandra | |
| 2008/0253346 A1 | 10/2008 | Terry | |
| 2009/0006910 A1 | 1/2009 | Hamzeh | |
| 2010/0284360 A1 | 11/2010 | Dalsgaard | |

* cited by examiner

*Primary Examiner* — Esaw Abraham
(74) *Attorney, Agent, or Firm* — Charles Bergere

(57) ABSTRACT

A method for determining a retransmission threshold condition in a selective repeat type, automatic repeat request (ARQ) wireless communication system. A set of negative acknowledgement (NACK) sequence numbers (SNs) corresponding to non-received data packets is received. First and second variables and an array representing a maximum number of retransmissions associated with each non-received data packet are determined. An index value is generated based on the array data and then compared with a threshold value to determine the retransmission threshold condition.

13 Claims, 5 Drawing Sheets

METHOD AND SYSTEM FOR DETECTING RETRANSMISSION THRESHOLD CONDITION IN SELECTIVE REPEAT ARQ COMMUNICATION SYSTEM

BACKGROUND OF THE INVENTION

The present invention relates generally to wireless communication systems and, more particularly, to a method for performing an automatic repeat request (ARQ) in mobile communication systems.

Wireless communication systems, such as mobile communication systems, use automatic repeat request (ARQ) techniques to detect severely degraded communication channel conditions and to avoid waste of communication link capacity. FIG. 1 shows a conventional mobile communication system 102 using an ARQ technique. The conventional mobile communication system 102 includes a transmitter 104 and a mobile communication device 106. The ARQ technique uses feedback messages, such as acknowledgement (ACK) and non-acknowledgement (NACK) messages to report failed transmissions. Examples for ARQ mechanisms operating over wireless channels include Radio Link Control (RLC) protocols, Hybrid ARQ (HARQ) protocol and the like.

The transmitter 104 transmits a stream of data packets 108 to the mobile communication device 106. Each transmitted data packet, such as data packet 110, includes a sequence number (SN) 112. The mobile communication device 106 receives the stream of data packets 108. For non-received data packets, the mobile communication device 106 communicates NACK SNs 114 to the transmitter 104. The transmitter 104 receives the NACK SNs 114 and attempts retransmission of the non-received data packets associated with these NACK SNs 114.

Mobile communication systems operating according to long term evolution (LTE) standards use selective, repeat ARQ techniques. Using these techniques, the mobile communication device 106 accumulates the NACK SNs and communicates the list of accumulated NACK SNs to the transmitter 104 at regular time intervals, for retransmission. Each NACK SN is stored in the transmitter 104. FIG. 2 shows the transmitter 104, which includes a plurality of counters 202a-202d for storing the NACK SNs 114.

LTE communication standards typically use a 1024-NACK SN and a 512-NACK SN format for performing selective, repeat ARQ. In the 1024-NACK SN format, the mobile communication device 106 accumulates a list of 1024 NACK SNs and communicates the list to the transmitter 104. In the 512-NACK SN format, the mobile communication device 106 accumulates a list of 512 NACK SNs and communicates the list to the transmitter 104. Using suitable techniques such as a half-window technique, 512 counters are required in the transmitter 104 to store 1024 NACK SNs, while 128 counters are required in the transmitter 104 to store 512 NACK SNs. This considerably increases the processing headroom of the transmitter 104, thereby increasing processing time.

It would be advantageous to have a wireless communication system using selective, repeat ARQ technique with reduced processing headroom and reduced processing time.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE INVENTION

Figure 1:
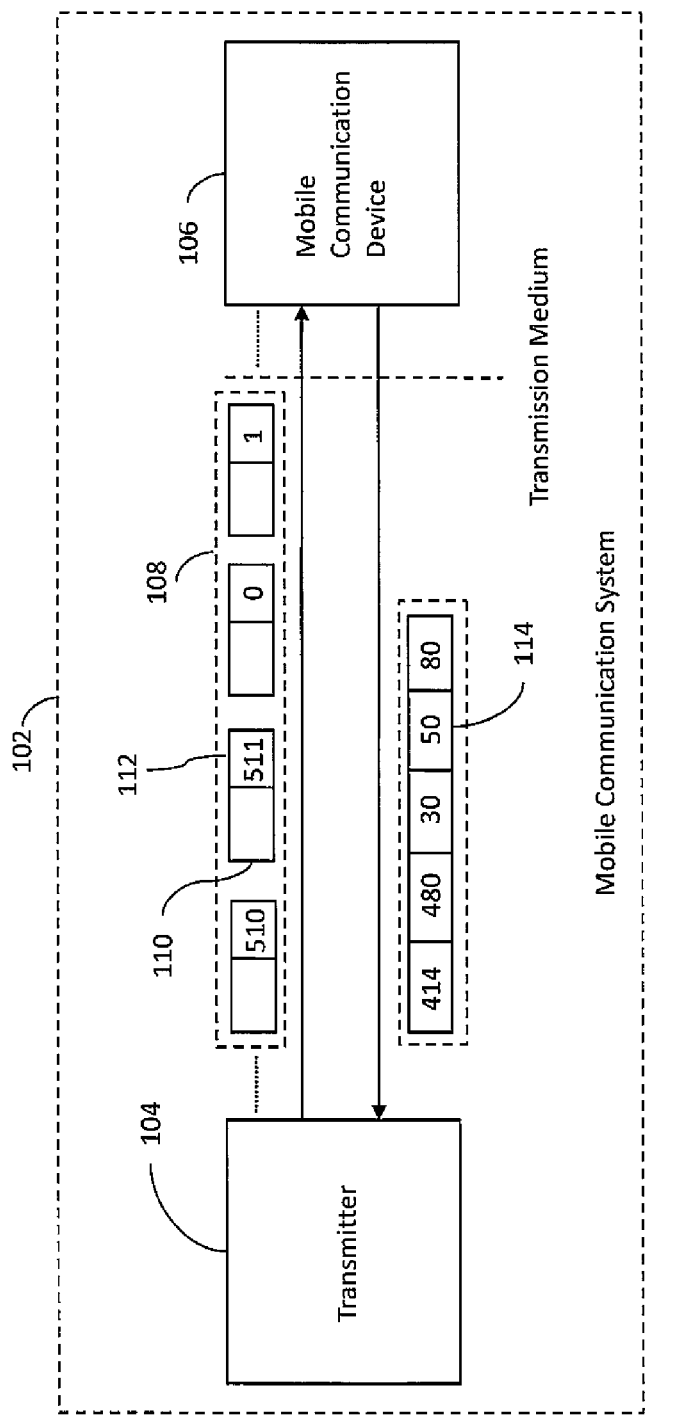
FIG. 1 is a schematic block diagram illustrating a conventional mobile communication system.
Figure 2:
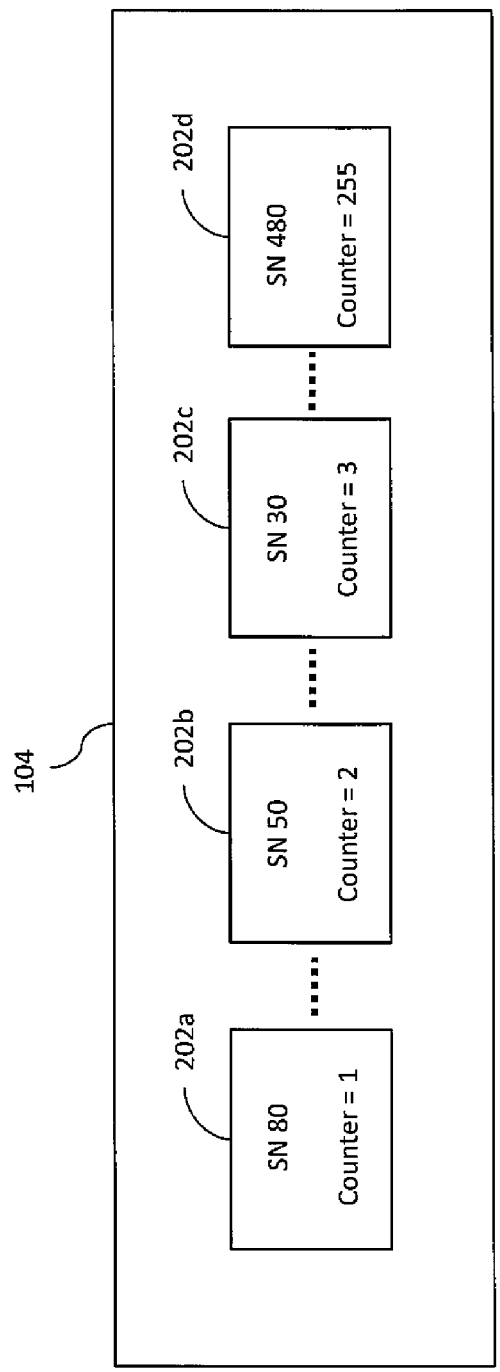
FIG. 2 is a schematic block diagram illustrating a transmitter used in the conventional mobile communication system of FIG. 1.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a method for determining a retransmission threshold condition in a selective repeat type, automatic repeat request (ARQ) wireless communication system is provided. The method includes receiving a set of negative acknowledgement (NACK) sequence numbers (SN) corresponding to a set of non-received data packets. The set of NACK SNs includes a lowest NACK SN and a highest NACK SN. A first variable corresponding to a position of the lowest NACK SN with respect to a previously received set of NACK SNs is determined. A second variable corresponding to a difference between the lowest NACK SN and the highest NACK SN is determined. Thereafter, an array is generated based on the first and second variables. One or more elements of the array correspond to a maximum number of retransmissions associated with each non-received data packet. An index value is generated based on the one or more elements. Subsequently, the index value is compared with a threshold value to determine the retransmission threshold condition.

In another embodiment of the present invention, a selective repeat type, ARQ mobile communication system capable of determining a retransmission threshold condition is provided. The mobile communication system includes a transmitter that transmits data packets to a mobile communication device and receives a set of NACK SNs corresponding to a set of non-received data packets from the mobile communication device. The set of NACK SNs includes a lowest NACK SN and a highest NACK SN. An ARQ processor is coupled to the transmitter. The ARQ processor determines a first variable and a second variable. The first variable corresponds to a position of the lowest NACK SN with respect to a previously received set of NACK SNs. The second variable corresponds to a difference between the lowest NACK SN and the highest NACK SN. The ARQ processor further generates an array based on the first and second variables. One or more elements of the array correspond to a maximum number of retransmissions associated with each non-received data packet. Thereafter, the ARQ processor generates an index value based on the one or more elements, and compares the index value with a threshold value to determine the retransmission threshold condition.

Embodiments of the present invention provide a method and system for determining a retransmission threshold condition in a selective repeat type, ARQ wireless communication system. The retransmission threshold condition is determined based on the first variable, the second variable, the array and the index value. This reduces the number of counters used for storing the NACK SNs (typically the number of counters required corresponds to the threshold value). Further, the method uses few variables (first variable, second variable, array, and index value) for determining the retransmission threshold condition. This enables efficient use of cache with reduced clock cycles for execution of the ARQ. Thus, the processing headroom as well as the processing time is reduced.

Figure 3:
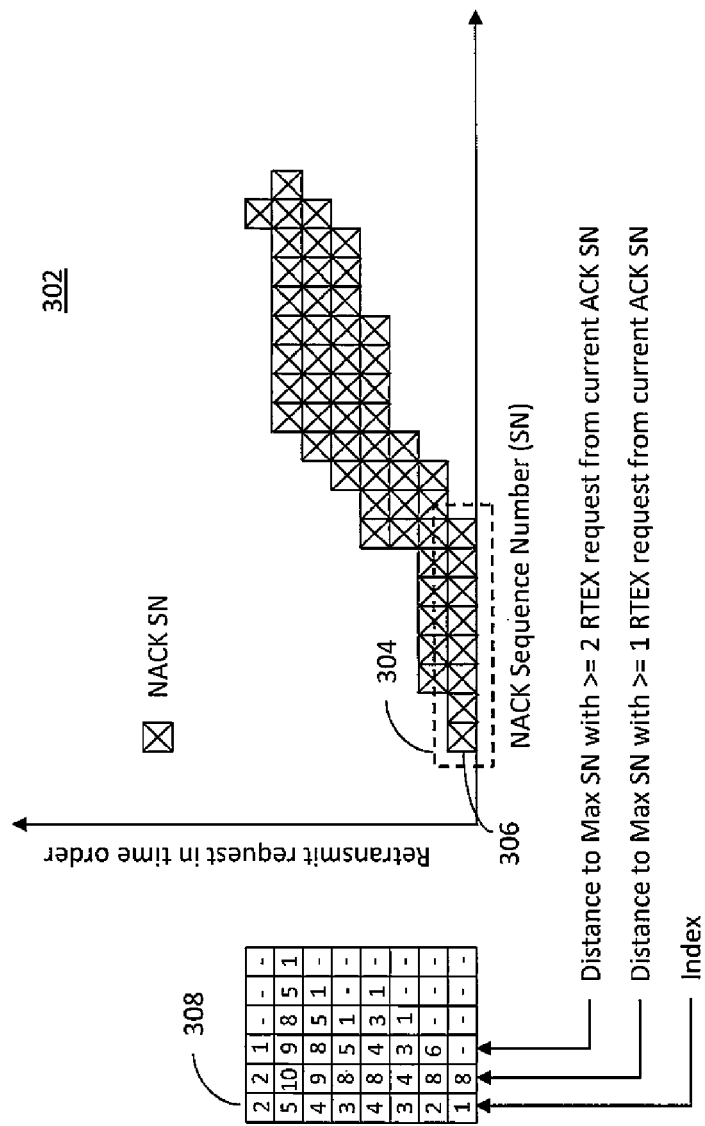
FIG. 3 is a graph for illustrating an exemplary ARQ technique in accordance with an embodiment of the present invention.

Referring now to FIG. 3, a graph 302 for illustrating an exemplary ARQ technique is shown, in accordance with an embodiment of the present invention. The graph 302 includes a plurality of sets of NACK SNs 304. Each NACK SN 306 of a set 304 is associated with a non-received data packet. An array 308 also is shown. The array 308 includes multiple variables used to determine the retransmission threshold condition, such as an index and some distance measurements, as will be described in detail in conjunction with FIG. 4.

Figure 4:
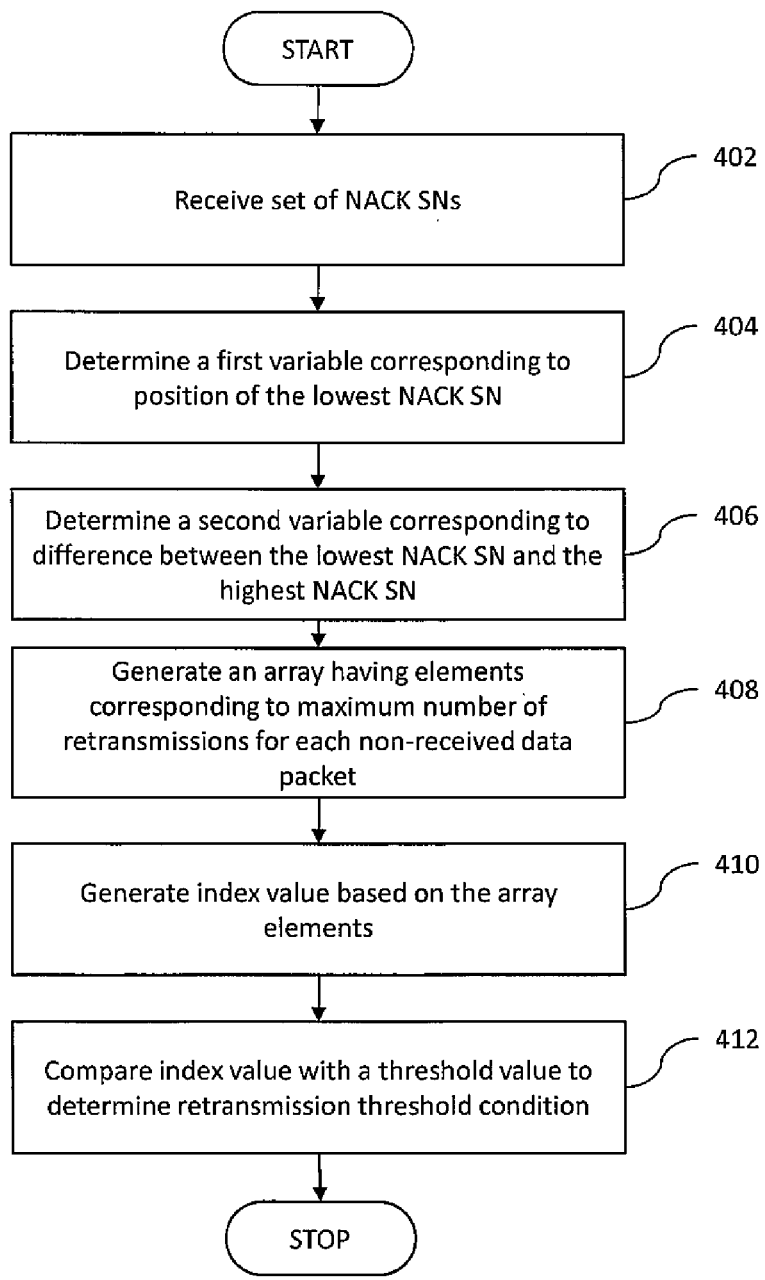
FIG. 4 is a flowchart illustrating a method for determining a retransmission threshold condition in a selective repeat type, ARQ wireless communication system in accordance with an embodiment of the present invention.

Referring now to FIG. 4, is a flowchart illustrating a method for determining a retransmission threshold condition in a selective repeat type, ARQ wireless communication system in accordance with an embodiment of the present invention. The wireless communication system includes a transmitter and a receiver. The transmitter transmits data packets to the receiver. In various embodiments of the present invention, the data packets may include audio data packets, video data packets, file transfer protocol (FTP) data packets, and the like. The receiver generates a NACK SN for each non-received data packet and transmits the NACK SN to the transmitter.

At step 402, a set of NACK SNs is received by the transmitter. Each NACK SN corresponds to a data packet which is not successfully received by a receiver. In various embodiments of the present invention, the transmitter receives multiple sets of NACK SNs at regular time intervals. Each set of NACK SNs includes a lowest NACK SN and a highest NACK SN. The lowest NACK SN corresponds to the SN associated with the first non-received data packet in a given time interval and the highest NACK SN corresponds to the SN associated with the last non-received data packet within the same time interval. As illustrated in FIG. 3, eight sets 304 of NACK SNs 306 are received by the transmitter at regular time intervals. The set 304 of NACK SNs 306 is the first set of NACK SNs received by the transmitter. The set 304 of NACK SNs 306 includes eight NACK SNs corresponding to eight data packets that were not successfully received by the receiver. The receiver accumulates the eight NACK SNs to form the set 304 of NACK SNs 306 and transmits the set 304 to the transmitter. In an exemplary embodiment of the present invention, the lowest NACK SN is '1' and the highest NACK SN is '8'.

At step 404, a first variable corresponding to a position of the lowest NACK SN with respect to a previously received set of NACK SNs is determined. The value of the first variable is equal to the logical difference between the lowest NACK SN from a current set of NACK SNs and the lowest NACK SN from the previously received set of NACK SNs. As illustrated in FIG. 3, the lowest NACK SN in the set 304 is '1'. As the set 304 is the first set of NACK SNs received by the transmitter, the value of the first variable is '0'. The first variable is used to determine the offset of the current set of NACK SNs from the previous set.

At step 406, a second variable corresponding to a difference between the lowest NACK SN and the highest NACK SN is determined. As illustrated in FIG. 3, the lowest NACK SN associated with the set 304 is '1' and the highest NACK SN is '8'. Hence, the second variable is equal to the logical difference between the lowest NACK SN and the highest NACK SN, i.e., '8'.

At step 408, an array is generated based on the first and second variables. The elements of the array correspond to a maximum number of retransmissions associated with each non-received data packet. As illustrated in FIG. 3, the second variable '8' is populated as the second element in the first row of the array 308. As the set 304 is the first set of NACK SNs received by the transmitter, the maximum number of retransmissions associated with each non-received data packet is '0'. Hence, the remaining blocks of the first are row empty.

At step 410, an index value is generated based on the elements populated in the array. The index value corresponds to the number of elements populated in a row of the array. As illustrated in FIG. 3, the first row includes one element and hence the index value '1' is populated as the first element of the first row, the second row as '2', etc.

At step 412, the index value is compared with a threshold value to determine the retransmission threshold condition. In various embodiments of the present invention, the threshold value is chosen based on the transmission requirements of the wireless communication system. The transmission requirements include parameters such as bit error rate (BER), data transmission speed, transmission bandwidth and the like. In an embodiment of the present invention, the retransmission of the set of non-received data packets is continued when the index value is less than the threshold value. In another embodiment of the present invention, the retransmission of the set of non-received data packets is discontinued when the index value is greater than or equal to the threshold value. In yet another embodiment of the present invention, at least one of a transmission rate, a transmission bandwidth, and a coding technique of the wireless communication system is modified based on the comparison between the index value and the threshold value.

Figure 5:
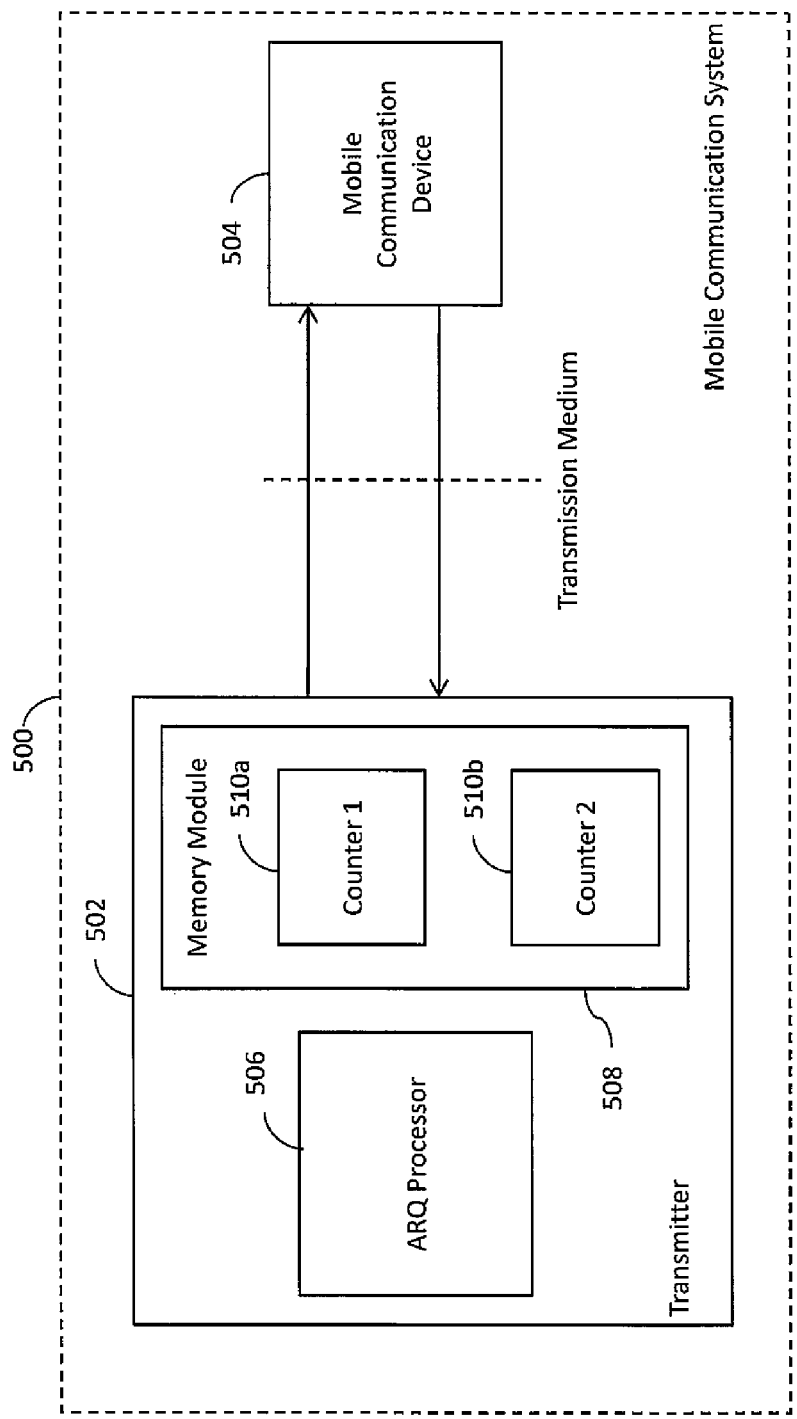
FIG. 5 is a schematic block diagram of a selective repeat type, ARQ mobile communication system in accordance with an embodiment of the present invention.

Referring now to FIG. 5, a schematic block diagram of a selective repeat type, ARQ mobile communication system 500 in accordance with an embodiment of the present invention is shown. The mobile communication system 500 includes a transmitter 502 and a mobile communication device 504. The transmitter 502 transmits data packets to the mobile communication device 504. In various embodiments of the present invention, the data packets may include audio data packets, video data packets, FTP data packets, and the like. Further, the mobile communication system 500 may operate in at least one of a LTE standard and a worldwide interoperability for Microwave Access (WiMAX) standard.

The transmitter 502 receives a set of NACK SNs corresponding to a set of non-received data packets from the mobile communication device 502. The set of NACK SNs includes a lowest NACK SN and a highest NACK SN. The lowest NACK SN corresponds to the SN associated with the first non-received data packet in a given time interval and the highest NACK SN corresponds to the SN associated with the last non-received data packet within the same time interval.

The transmitter 502 includes an ARQ processor 506 and a memory module 508. The ARQ processor 506 determines a first variable corresponding to a position of the lowest NACK SN with respect to a previously received set of NACK SNs.

The value of the first variable is equal to the logical difference between the lowest NACK SN from current set of NACK SNs and the lowest NACK SN from the previously received set of NACK SNs. The ARQ processor 506 further determines a second variable corresponding to a difference between the lowest NACK SN and the highest NACK SN is determined. Thereafter, the ARQ processor 506 generates an array based on the first and second variables. The elements of the array correspond to a maximum number of retransmissions associated with each non-received data packet. The ARQ processor 506 generates an index value based on the elements populated in the array and compares the index value with a threshold value to determine the retransmission threshold condition. The memory module 508 includes a plurality of counters, such as counters 510a and 510b, to store the first variable, the second variable and the array and the index value.

In various embodiments of the present invention, the threshold value is chosen based on the transmission requirements of the mobile communication system. The transmission requirements may include parameters such as BER, data transmission speed, transmission bandwidth and the like. In an embodiment of the present invention, the transmitter 502 continues retransmission of the set of non-received data packets to the mobile communication device 504 when the index value is less than the threshold value. In another embodiment of the present invention, the transmitter 502 discontinues the retransmission of the set of non-received data packets to the mobile communication device 504 when the index value is greater than or equal to the threshold value. In yet another embodiment of the present invention, the transmitter 502 modifies at least one of the transmission rate, transmission bandwidth, and coding technique based on the comparison between the index value and the threshold value.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A method for determining a retransmission threshold condition in a selective repeat type, automatic repeat request (ARQ) wireless communication system, comprising:
    receiving a set of negative acknowledgement (NACK) sequence numbers (SN) corresponding to a set of non-received data packets, wherein the set of NACK SNs comprises a lowest NACK SN and a highest NACK SN;
    determining a first variable corresponding to a position of the lowest NACK SN with respect to a previously received set of NACK SNs;
    determining a second variable corresponding to a difference between the lowest NACK SN and the highest NACK SN;
    generating an array based on the first and second variables, wherein one or more elements of the array correspond to a maximum number of retransmissions associated with each non- received data packet;
    generating an index value based on the one or more elements;
    comparing the index value with a threshold value to determine the retransmission threshold condition; and
    continuing retransmission of the set of non-received data packets based on the retransmission threshold condition.

2. The method of claim 1, wherein each element in the array corresponds to a count of NACK SNs associated with a corresponding non-received data packet.

3. The method of claim 1, further comprising discontinuing the retransmission of the set of non-received data packets based on the retransmission threshold condition.

4. The method of claim 1, further comprising modifying at least one of a transmission rate, a transmission bandwidth, and a coding technique used in the wireless communication system based on the retransmission threshold condition.

5. The method of claim 1, wherein the data packets comprise at least one of audio data packets, video data packets and file transfer protocol (FTP) data packets.

6. A selective repeat type, automatic repeat request (ARQ) mobile communication system, comprising:
    a transmitter that transmits data packets to a mobile communication device and receives a set of negative acknowledgement (NACK) sequence numbers (SN) corresponding to a set of non-received data packets from the mobile communication device, wherein the set of NACK SNs includes a lowest NACK SN and a highest NACK SN; and
    an ARQ processor, coupled to the transmitter, that determines a first variable corresponding to a position of the lowest NACK SN with respect to a previously received set of NACK SNs, determines a second variable corresponding to a difference between the lowest NACK SN and the highest NACK SN, generates an array based on the first and second variables, wherein one or more elements of the array correspond to a maximum number of retransmissions associated with each non-received data packet, generates an index value based on the one or more elements, and compares the index value with a threshold value to determine the retransmission threshold condition.

7. The mobile communication system of claim 6, further comprising a memory module coupled to the processor for storing each of the first variable, the second variable, the array, and the index value.

8. The mobile communication system of claim 7, wherein the memory module includes one or more counters.

9. The mobile communication system of claim 6, wherein the data packets comprise at least one of audio data packets, video data packets, and file transfer protocol (FTP) data packets.

10. The mobile communication system of claim 6, wherein the transmitter continues retransmission of the set of non-received data packets to the mobile communication device based on the retransmission threshold condition.

11. The mobile communication system of claim 10, wherein the transmitter discontinues the retransmission of the set of non-received data packets to the mobile communication device based on the retransmission threshold condition.

12. The mobile communication of claim 6, wherein the transmitter modifies at least one of a transmission rate, a transmission bandwidth, and a coding technique used in the mobile communication system based on the retransmission threshold condition.

13. The mobile communication system of claim 6, wherein the mobile communication system operates in at least one of a long term evolution (LTE) standard and a worldwide interoperability for Microwave Access (WiMAX) standard.

* * * * *